(12) United States Patent
Kobayashi

(10) Patent No.: US 10,228,120 B2
(45) Date of Patent: Mar. 12, 2019

(54) ILLUMINATION UNIT AND DISPLAY APPARATUS

(71) Applicant: SONY CORPORATION, Tokyo (JP)

(72) Inventor: Kazumi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 15/310,465

(22) PCT Filed: Apr. 27, 2015

(86) PCT No.: PCT/JP2015/062712
§ 371 (c)(1),
(2) Date: Nov. 11, 2016

(87) PCT Pub. No.: WO2015/178171
PCT Pub. Date: Nov. 26, 2015

(65) Prior Publication Data
US 2017/0082278 A1    Mar. 23, 2017

(30) Foreign Application Priority Data

May 21, 2014 (JP) .................. 2014-105136

(51) Int. Cl.
*F21V 29/76* (2015.01)
*F21S 2/00* (2016.01)
(Continued)

(52) U.S. Cl.
CPC ................ *F21V 29/76* (2015.01); *F21S 2/00* (2013.01); *F21V 15/01* (2013.01); *F21V 23/00* (2013.01);
(Continued)

(58) Field of Classification Search
CPC ........ F21V 29/76; F21V 29/67; F21V 29/503; F21V 23/06; F21V 15/01; F21S 2/00; G02B 21/2033; G02B 21/16
See application file for complete search history.

(56) References Cited

U.S. PATENT DOCUMENTS 5,528,474 A * 6/1996 Roney .................. B60Q 1/2696
362/545
2010/0066979 A1  3/2010 Miyazaki
(Continued)

FOREIGN PATENT DOCUMENTS

CN    102929085 A    2/2013
CN    103019016 A    4/2013
(Continued)

OTHER PUBLICATIONS

International Preliminary Report on Patentability of PCT Application No. PCT/JP2015/062712, dated Nov. 22, 2016, 06 pages.
International Search Report and Written Opinion of PCT Application No. PCT/JP2015/062712, dated Jul. 7, 2015, 08 pages of English Translation and 08 pages of ISRWO.

*Primary Examiner* — David V Bruce
(74) *Attorney, Agent, or Firm* — Chip Law Group

(57) ABSTRACT

There is provided an illumination unit including a light emitting device with a coupling surface, the light emitting device including a terminal provided on the coupling surface, a holding member that houses the light emitting device, a wiring substrate that is provided separately from the coupling surface of the light emitting device and is electrically coupled with the terminal, and a heatsink that includes an adjacent part adjacent to the coupling surface of the light emitting device.

22 Claims, 16 Drawing Sheets

(51) Int. Cl.
*F21V 23/00* (2015.01)
*G03B 21/16* (2006.01)
*F21V 29/503* (2015.01)
*F21V 29/67* (2015.01)
*F21V 15/01* (2006.01)
*F21V 23/06* (2006.01)
*G03B 21/20* (2006.01)

(52) U.S. Cl.
CPC ............ *F21V 23/06* (2013.01); *F21V 29/503* (2015.01); *F21V 29/67* (2015.01); *G03B 21/16* (2013.01); *G03B 21/2033* (2013.01)

(56) References Cited

U.S. PATENT DOCUMENTS

2013/0038841 A1    2/2013  Makoto et al.
2013/0070215 A1*  3/2013  Higo .................... G03B 21/204
                                                               353/85

FOREIGN PATENT DOCUMENTS

| JP | 2008-145486 A | 6/2008 |
| JP | 2008-216288 A | 9/2008 |
| JP | 2010-107751 A | 5/2010 |
| JP | 2013-37216 A | 2/2013 |
| JP | 2013-62172 A | 4/2013 |
| JP | 2013-65507 A | 4/2013 |

* cited by examiner

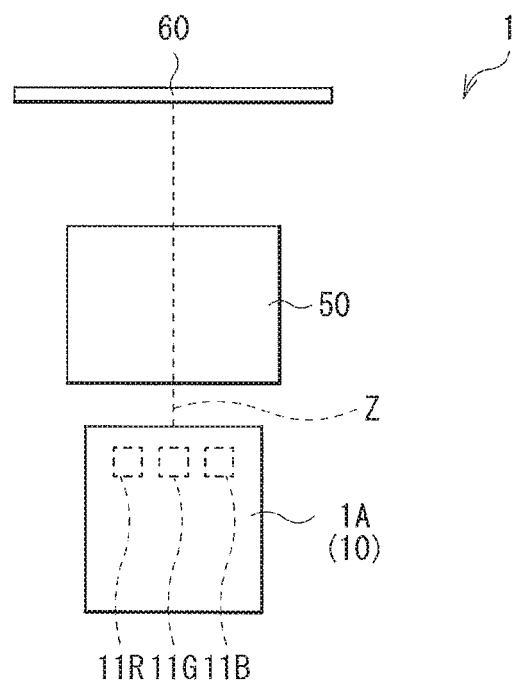
[FIG. 1]

[FIG.2]
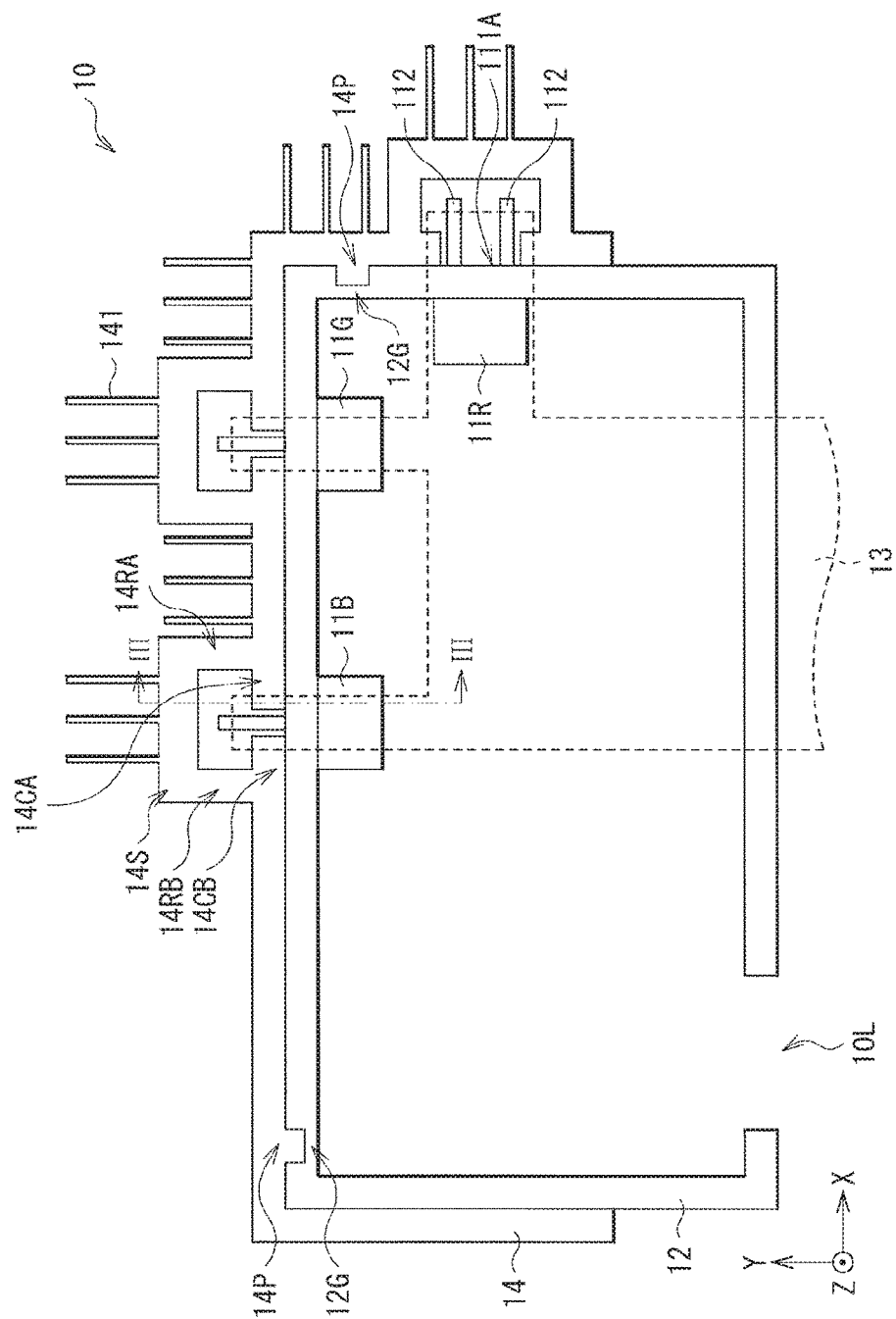

[ FIG. 3 ]
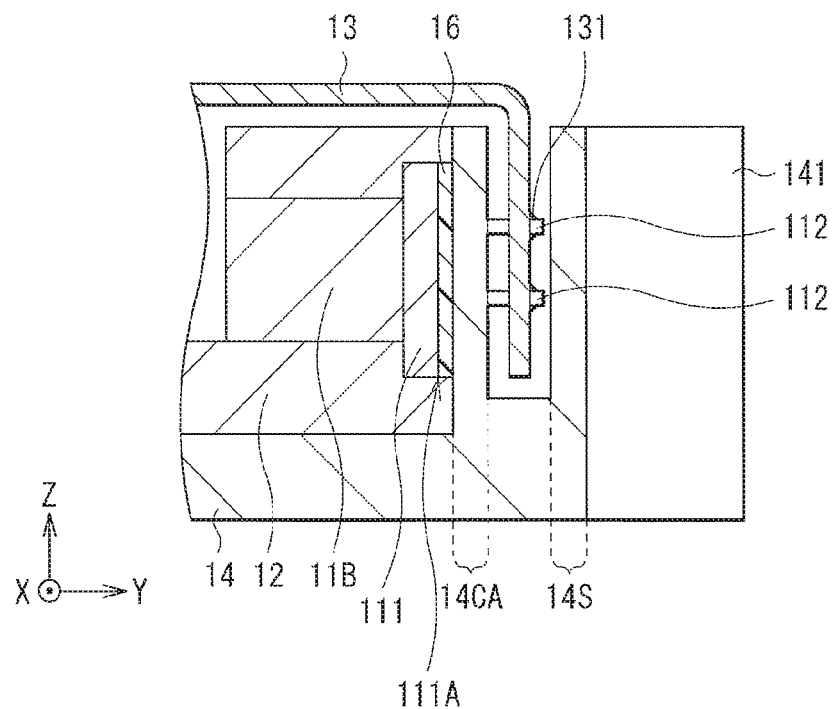

[ FIG. 4 ]
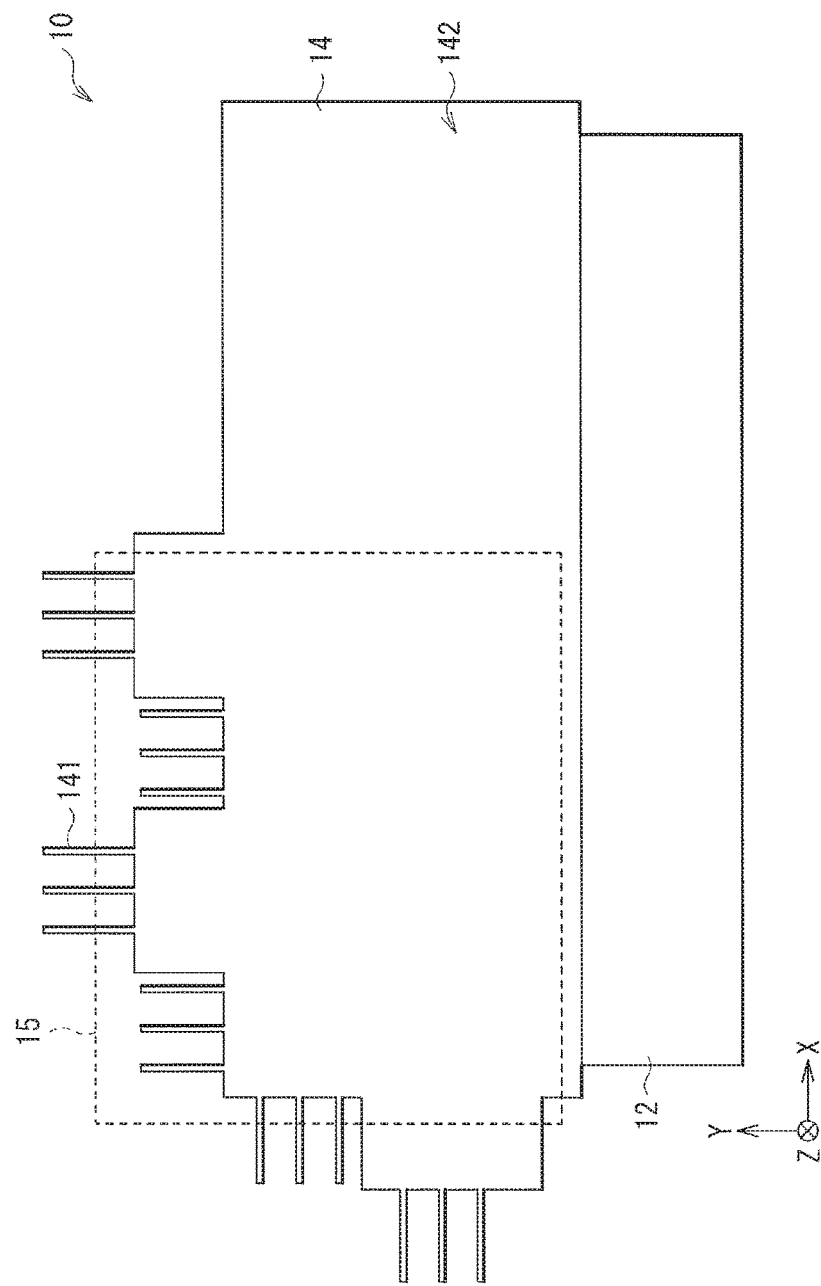

[ FIG. 5 ]
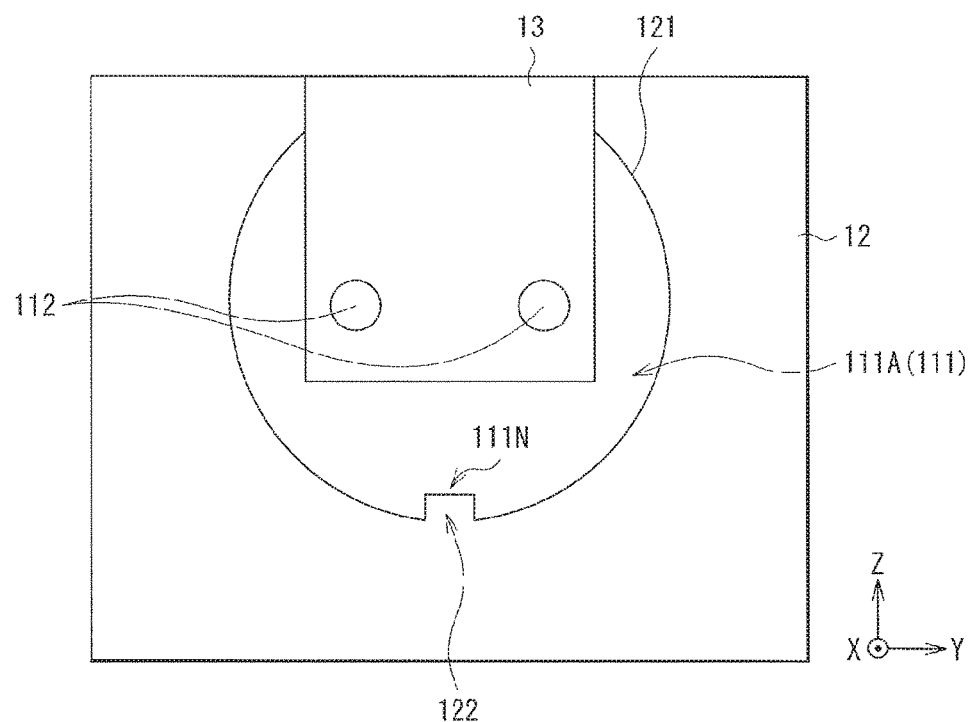

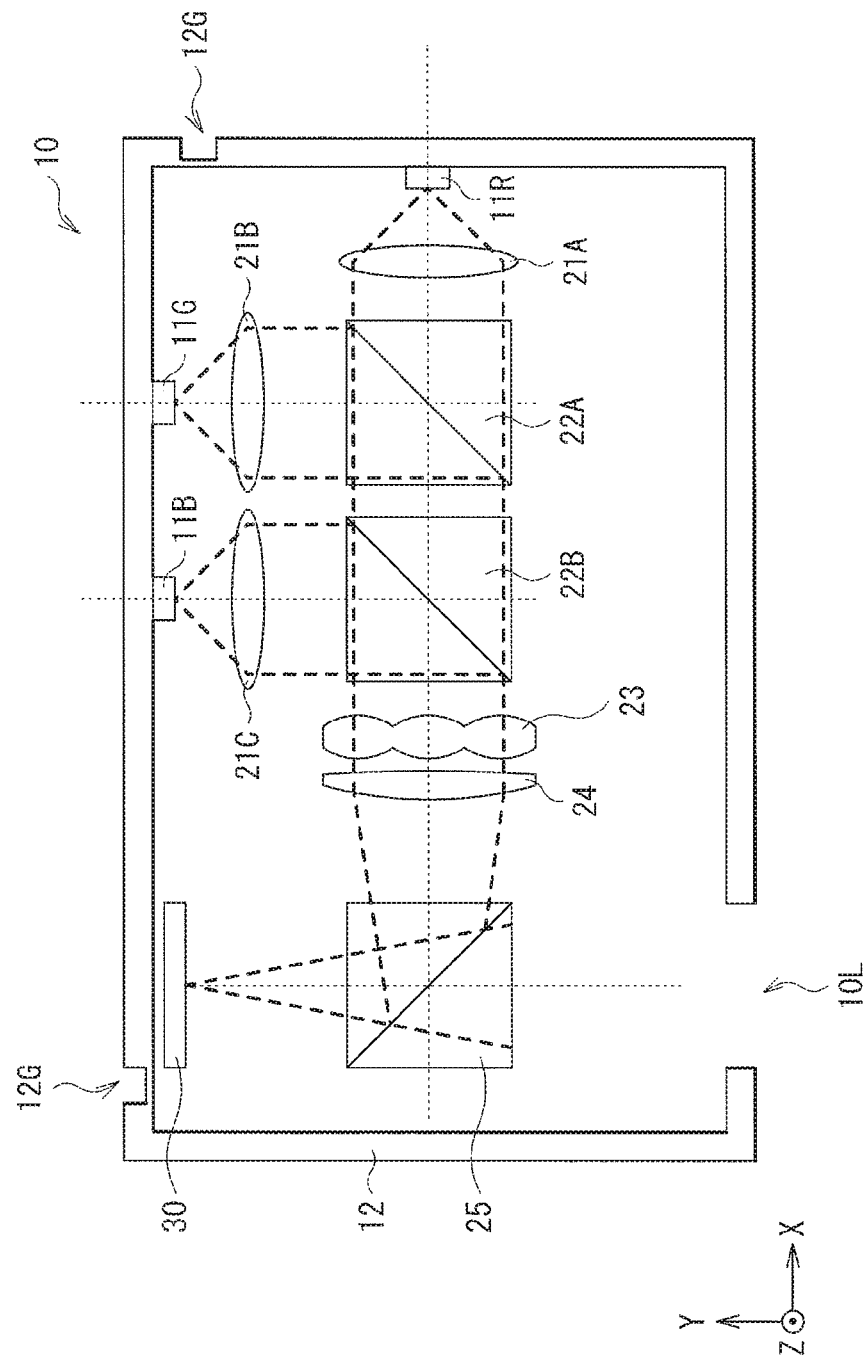
[FIG. 6]

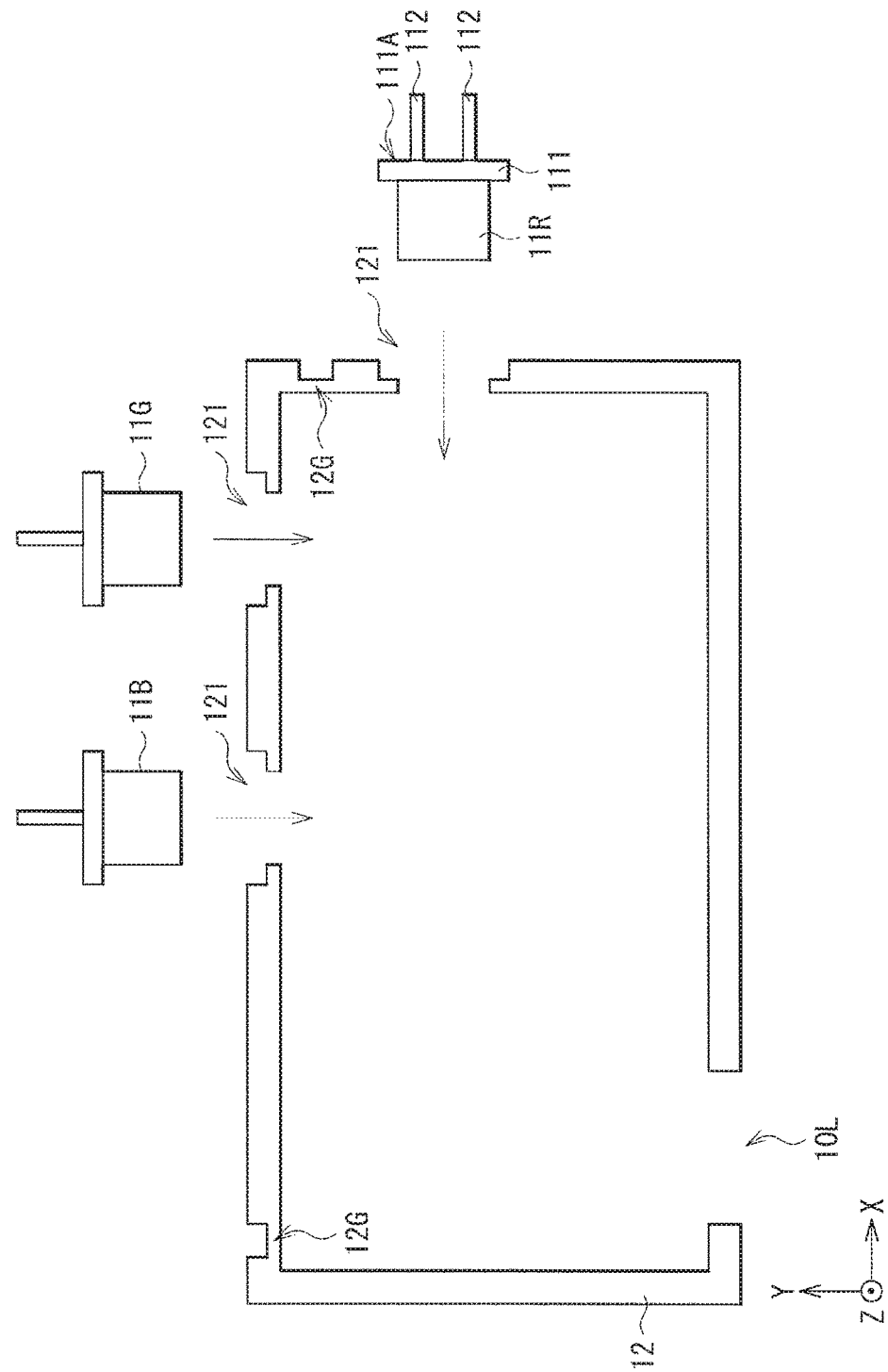
[FIG. 7]

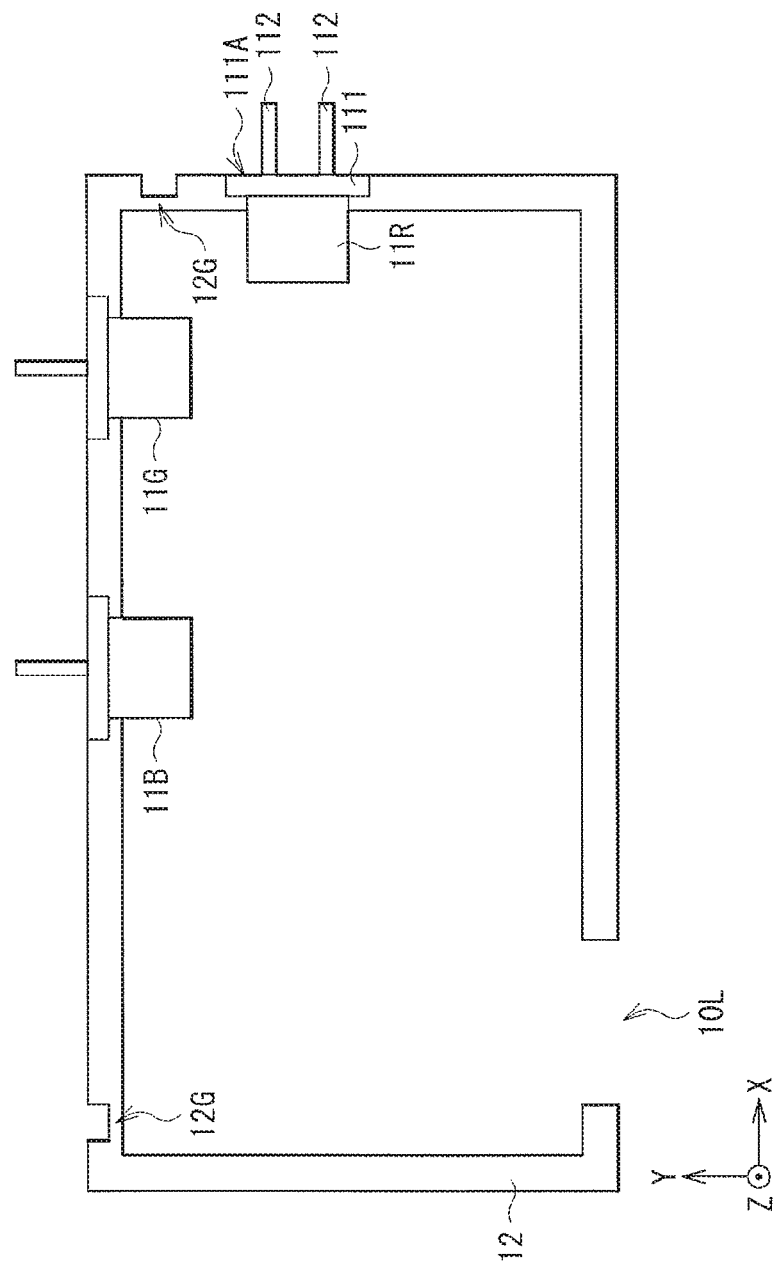
[FIG. 8]

[FIG. 9]
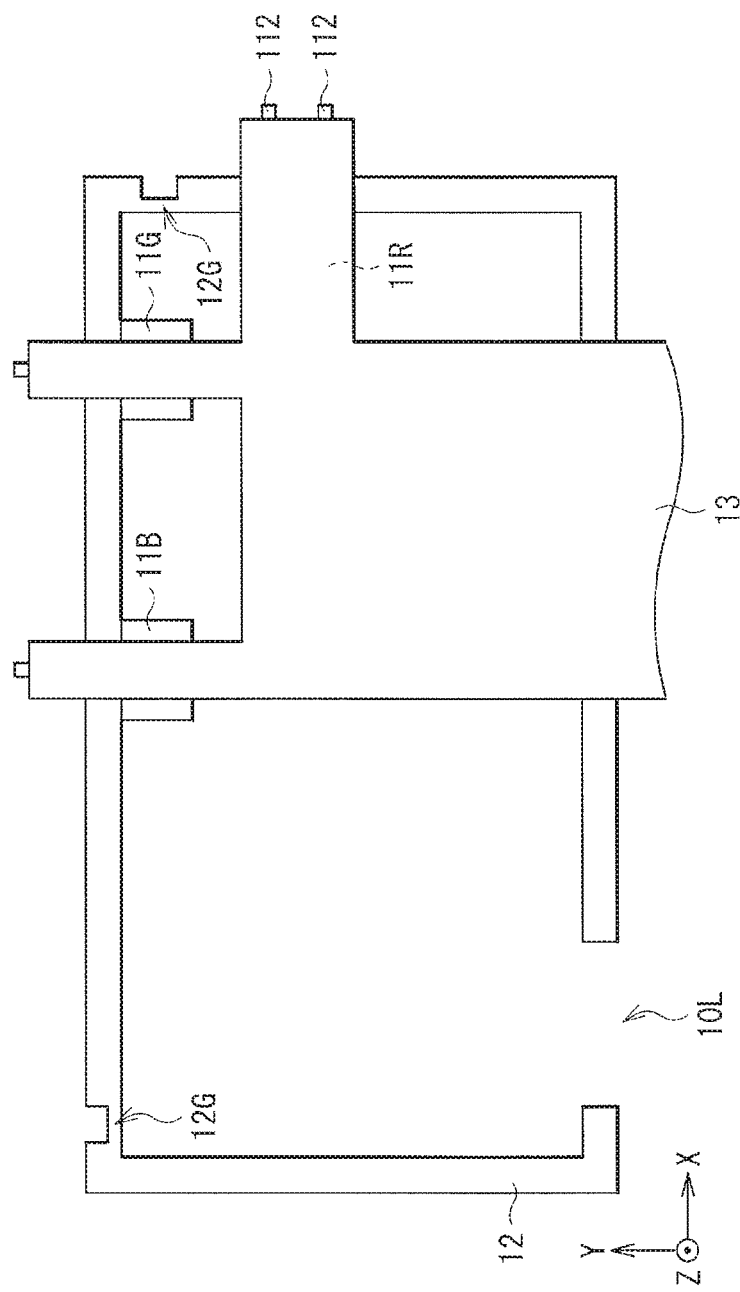

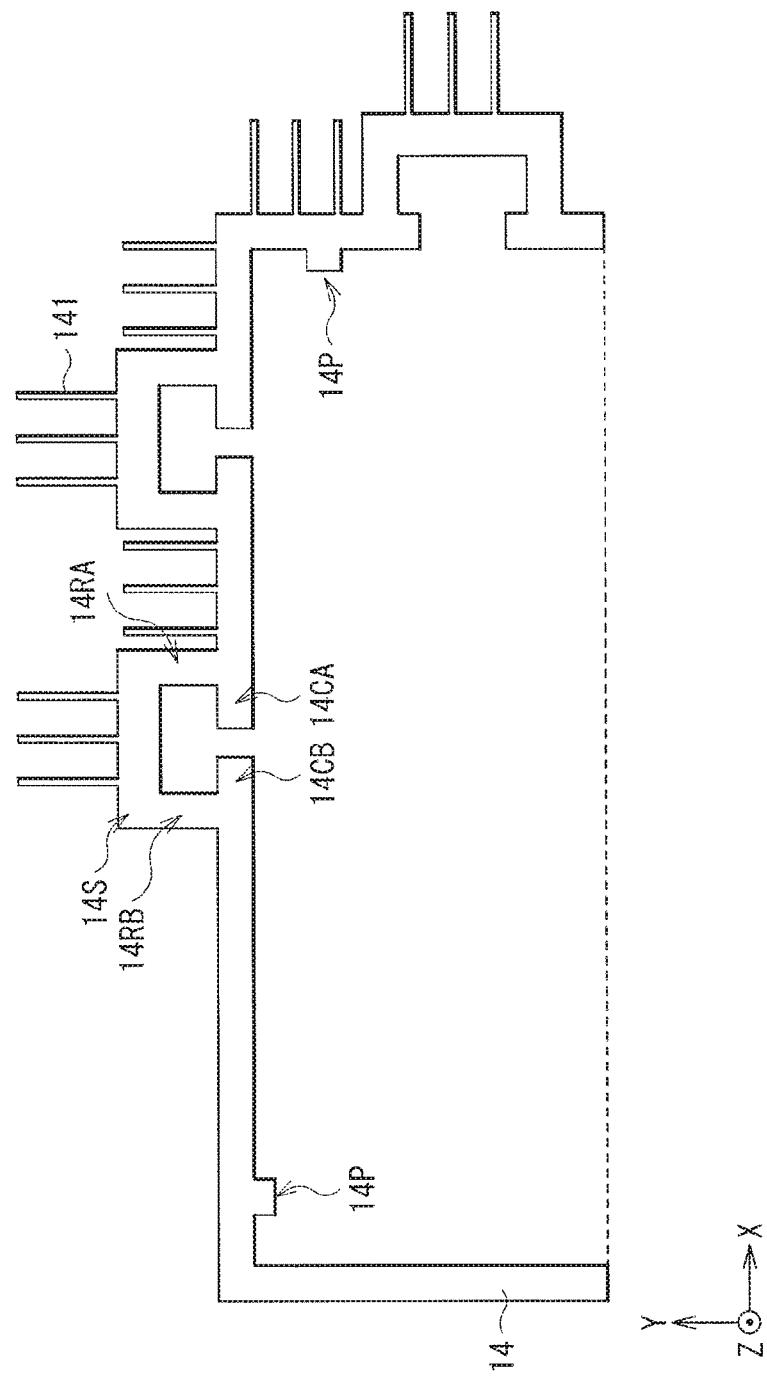
[ FIG. 10 ]

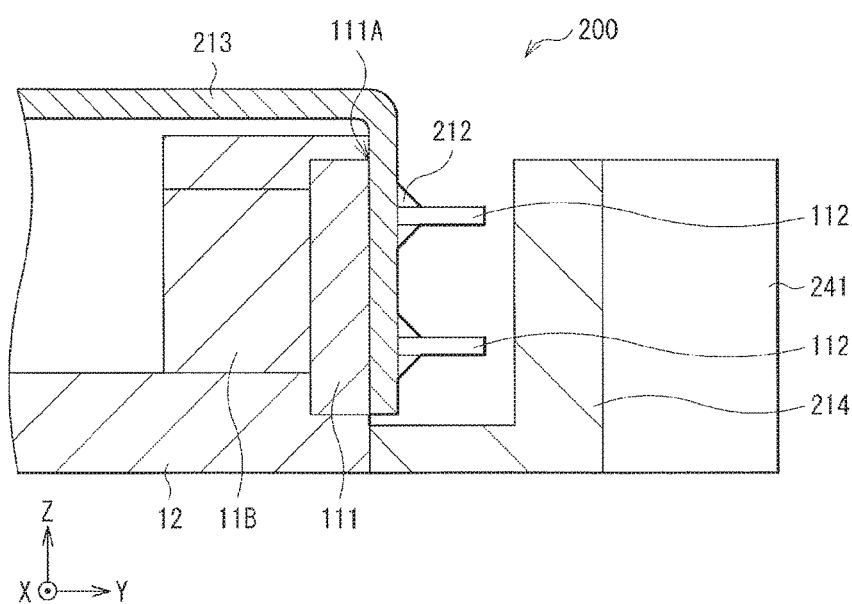
[ FIG. 11 ]

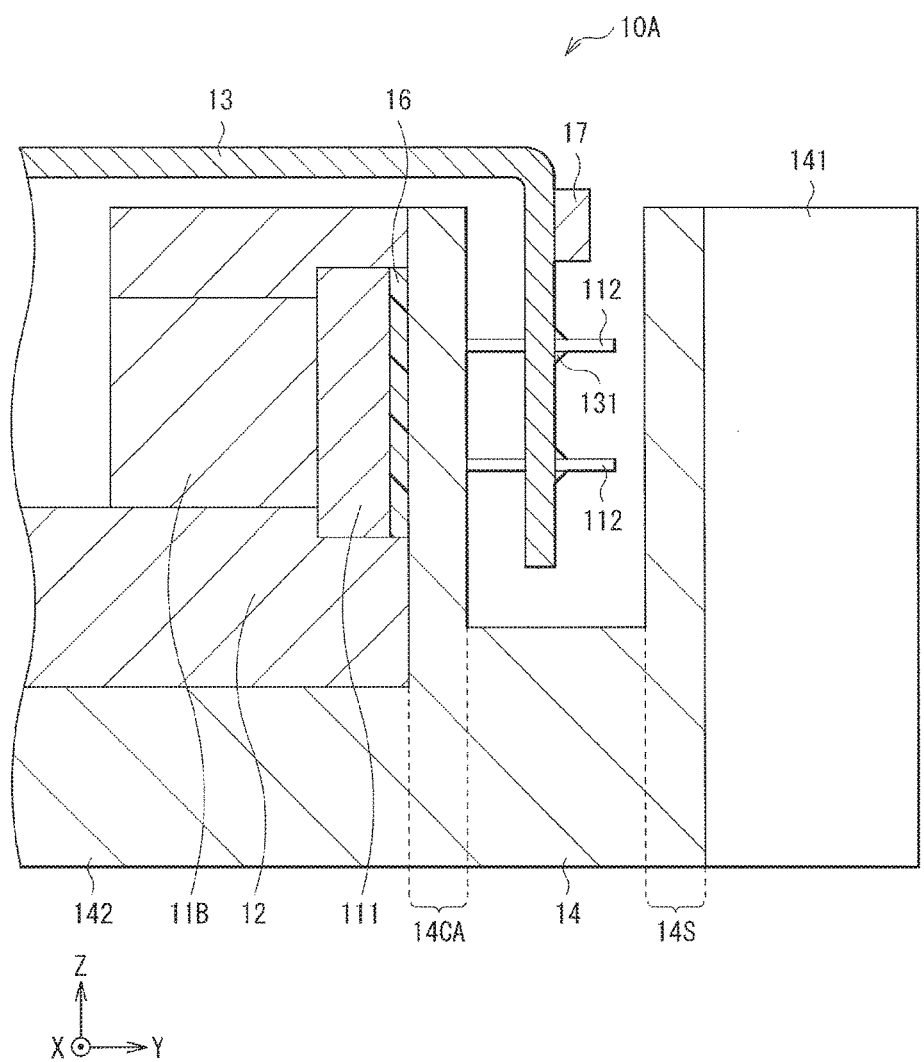
[FIG. 12]

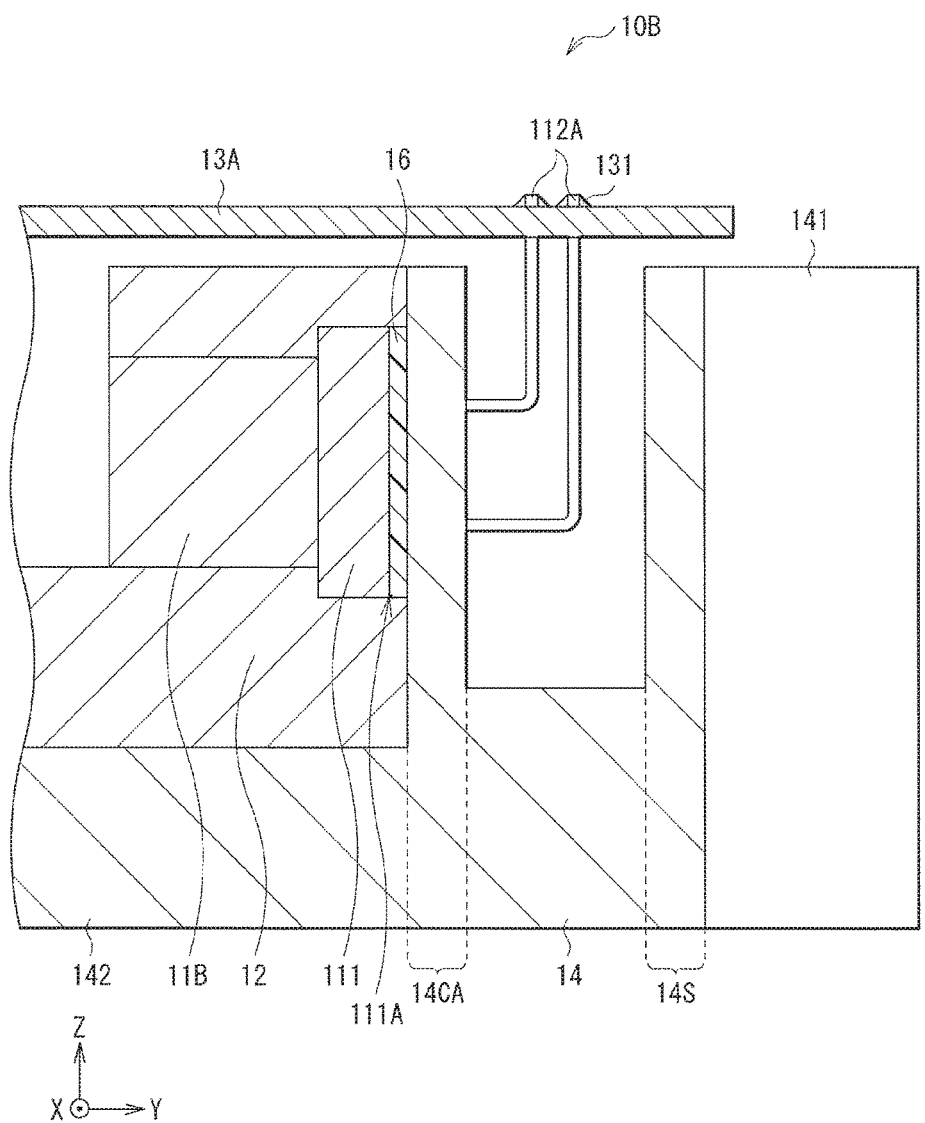
[ FIG. 13 ]

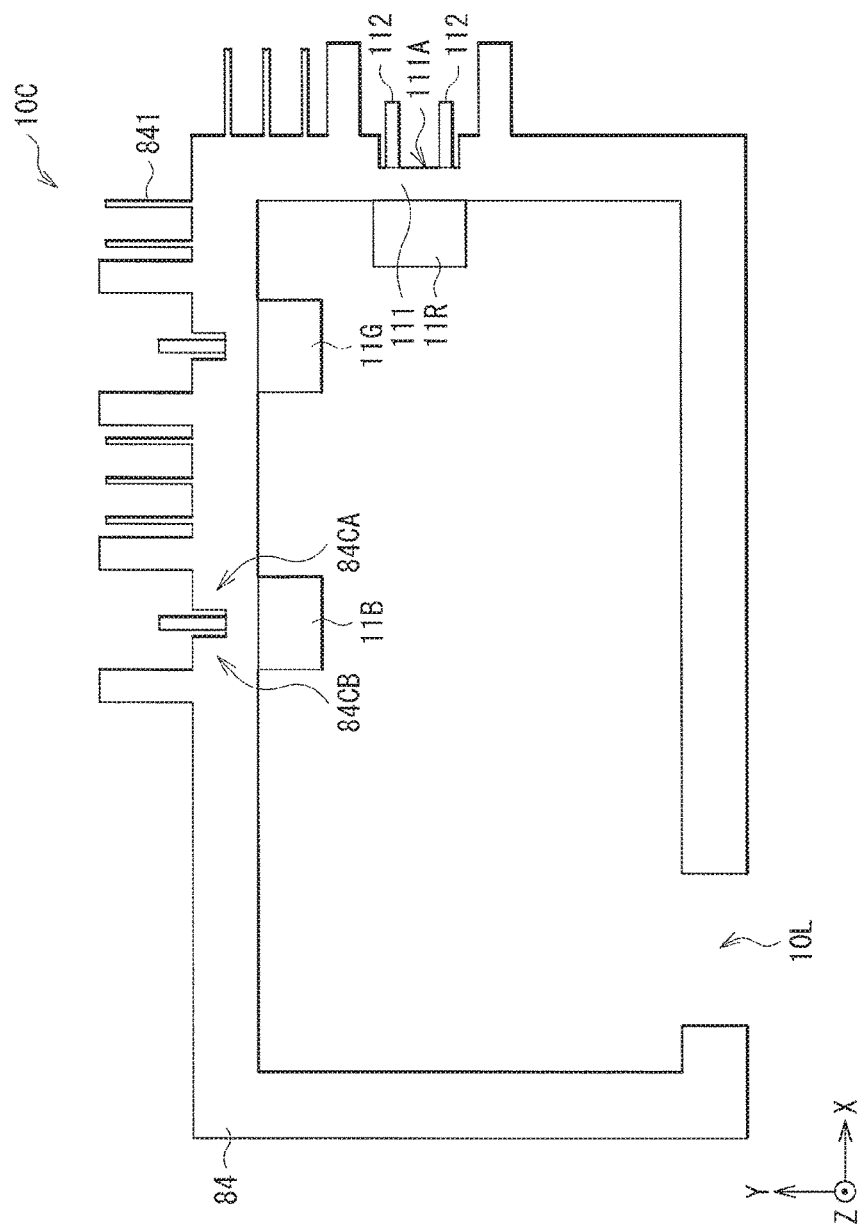
[FIG. 14]

[FIG. 15]
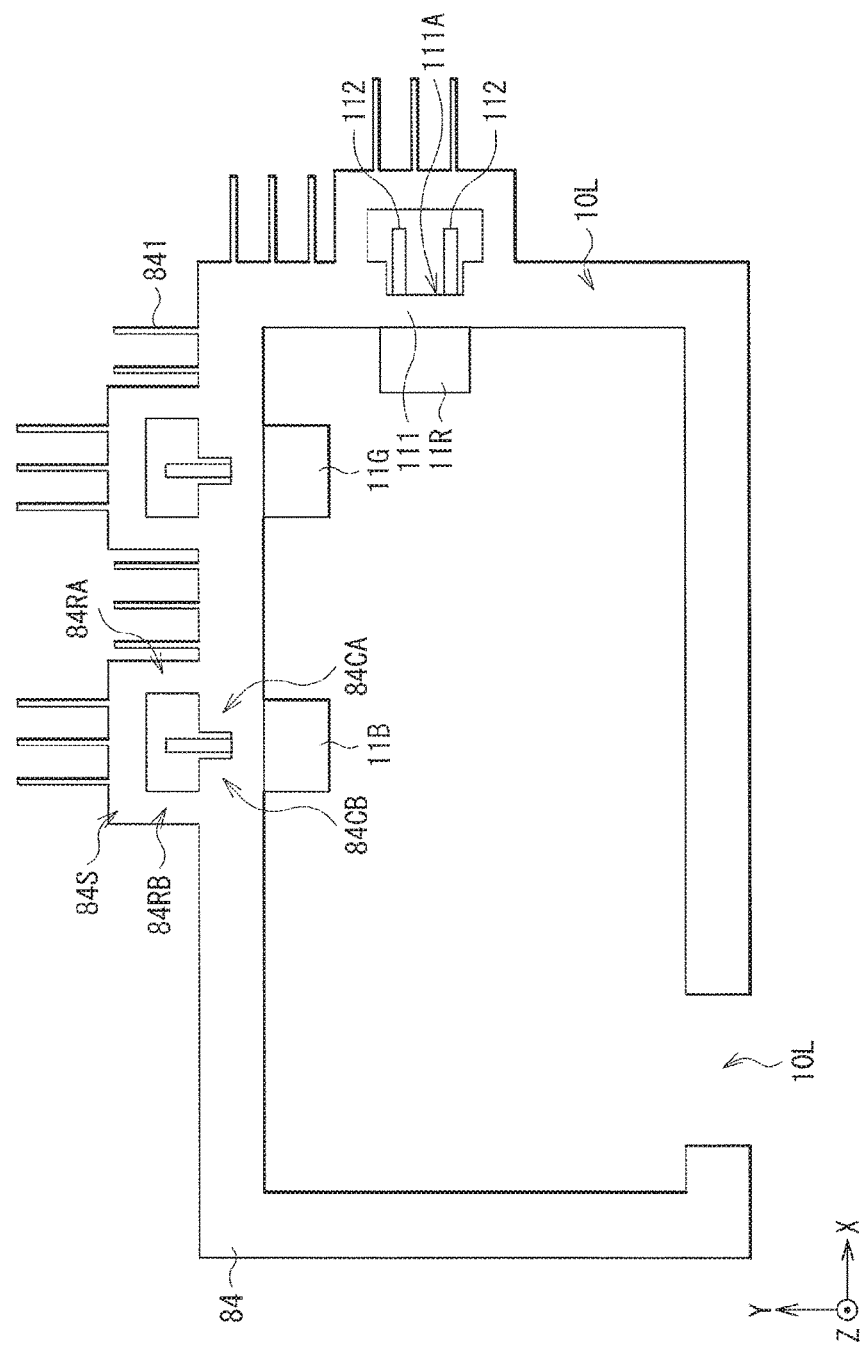

[FIG. 16]
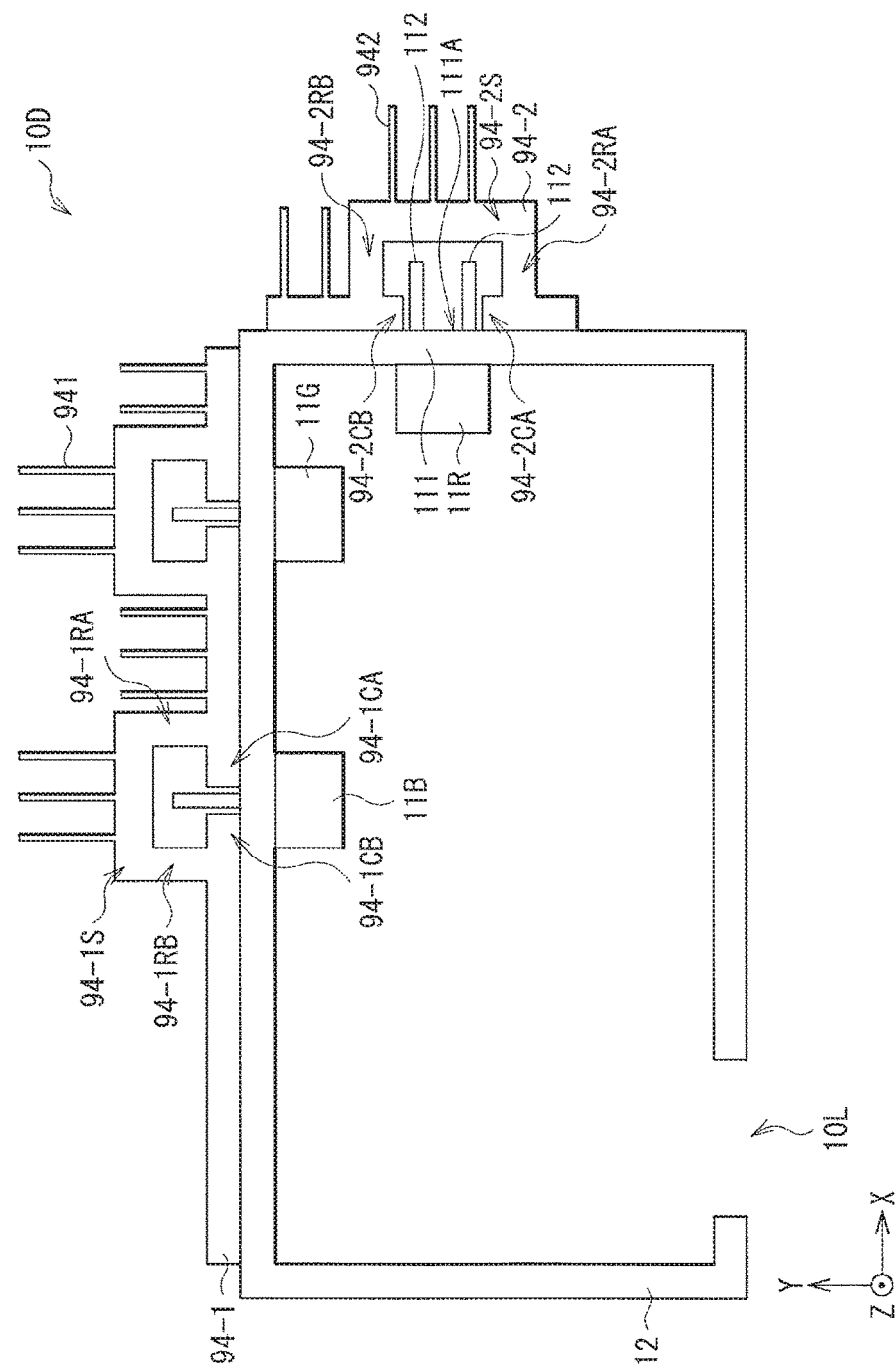

ILLUMINATION UNIT AND DISPLAY APPARATUS

CROSS REFERENCE TO RELATED APPLICATIONS

This application is a U.S. National Phase of International Patent Application No. PCT/JP2015/062712 filed on Apr. 27, 2015, which claims priority benefit of Japanese Patent Application No. JP 2014-105136 filed in the Japan Patent Office on May 21, 2014. Each of the above-referenced applications is hereby incorporated herein by reference in its entirety.

TECHNICAL FIELD

The technology relates to an illumination unit that includes a light emitting device such as a laser, and to a display apparatus that uses such an illumination unit to perform image display.

BACKGROUND ART

An optical module that is one of main components of a projector (a projection display apparatus) is typically configured of an illumination optical system (an illumination unit) that includes a light emitting device, and a projection optical system that includes a spatial modulation device. In recent years, a laser attracts attention as the light emitting device of the projector.

The laser is housed in a holding member. For example, in the illumination unit, a heatsink is so provided as to be in contact with the holding member, and heat emitted from the laser is transferred to the heatsink through the holding member (for example, see PTLs 1 and 2).

CITATION LIST

Patent Literature

PTL 1: Japanese Unexamined Patent Application Publication No. 2011-134668
PTL 2: Japanese Unexamined Patent Application Publication No. 2013-65507

SUMMARY OF INVENTION

However, the light emitting device is not sufficiently cooled by such an illumination unit, and further improvement in heat dissipation efficiency is desired.

Thus, it is desirable to provide an illumination unit and a display apparatus that dissipate heat of the light emitting device with high efficiency.

An illumination unit according to an embodiment of the technology includes: a light emitting device that has a coupling surface and includes a terminal provided on the coupling surface; a holding member that houses the light emitting device; a wiring substrate that is provided separately from the coupling surface of the light emitting device and is electrically coupled with the terminal; and a heatsink that includes an adjacent part adjacent to the coupling surface of the light emitting device.

A display apparatus according to an embodiment of the technology includes: the illumination unit according to an embodiment of the technology mentioned above; and a projection unit that projects illumination light from the illumination unit.

In the illumination unit and the display apparatus according to an embodiment of the technology, the heatsink includes the adjacent part adjacent to the light emitting device. Thus, the heat is directly transferred from the light emitting device to the heatsink without the holding member.

According to the illumination unit and the display apparatus according to an embodiment of the technology, the heat is directly transferred from the light emitting device to the heatsink, and thus it becomes possible to improve heat dissipation efficiency of the light emitting device. Note that effects described herein are non-limiting. Effects achieved by the technology may be one or more of effects described in the disclosure.

BRIEF DESCRIPTION OF DRAWINGS

FIG. 1 is a diagram illustrating an entire configuration of a display apparatus according to an embodiment of the technology.

FIG. 2 is a top view illustrating a schematic configuration of a light source unit illustrated in FIG. 1.

FIG. 3 is a diagram illustrating a cross-sectional configuration taken along line illustrated in FIG. 2.

FIG. 4 is a bottom view illustrating a configuration of the light source unit illustrated in FIG. 2.

FIG. 5 is a plan view illustrating a configuration of a holding member illustrated in FIG. 2, together with a red laser and a wiring substrate.

FIG. 6 is a diagram illustrating optical members included in the light source unit illustrated in FIG. 1.

FIG. 7 is a top view illustrating an example of a step of manufacturing the light source unit illustrated in FIG. 2.

FIG. 8 is a top view illustrating a step following the step of FIG. 7.

FIG. 9 is a top view illustrating a step following the step of FIG. 8.

FIG. 10 is a top view illustrating a configuration of a heatsink illustrated in FIG. 2.

FIG. 11 is a cross-sectional diagram illustrating a configuration of a light source unit according to a comparative example.

FIG. 12 is a cross-sectional diagram illustrating a configuration of a light source unit according to a modification example 1.

FIG. 13 is a cross-sectional diagram illustrating a configuration of a light source unit according to a modification example 2.

FIG. 14 is a top view illustrating a configuration of a light source unit according to a modification example 3.

FIG. 15 is a top view illustrating another example of a heatsink illustrated in FIG. 14.

FIG. 16 is a top view illustrating a configuration of a light source unit according to a modification example 4.

DESCRIPTION OF EMBODIMENTS

Some embodiments of the technology are described in detail below with reference to drawings. Note that description is given in the following order.

1. Embodiment (display apparatus)
2. Modification example 1 (illumination unit: an example including a temperature sensor)
3. Modification example 2 (illumination unit: an example in which a terminal is bent)
4. Modification example 3 (illumination unit: an example in which a holding member is integrated with a heatsink)

5. Modification example 4 (illumination unit: an example including a plurality of heatsinks)
   <Embodiment>
   [Entire Configuration of Display Apparatus 1]

FIG. 1 is a diagram illustrating an entire configuration of a display apparatus (a display apparatus 1) according to an embodiment of the technology. The display apparatus 1 is a projector that projects an image (image light) to a screen 60 (a projected surface), and includes an illumination unit 1A that includes, along an optical axis Z, a light source unit 10 and a projection lens 50 (a projection unit) that projects illumination light from the illumination unit 1A. The display apparatus 1 further includes a spatial modulation device (a reflective liquid crystal device 30 in FIG. 6 described later). Hereinafter, the description is given assuming that the spatial modulation device is incorporated in the illumination unit 1A; however, the configuration is not limited thereto.

The light source unit 10 houses, in a single package, two or more kinds of light emitting devices that emit light of wavelengths different from one another (two or more kinds of light emitting devices are packaged). In the present embodiment, three kinds of laser light sources 11 of R, G, and B (a red laser 11R, a green laser 11G, and a blue laser 11B) are used. The detailed configuration of the light source unit 10 is described later.

The projection lens 50 is a lens to project (enlarge and project), to the screen 60, image light emitted from the light source unit 10, and may be configured of, for example, a plurality of lenses.

[Detailed Configuration of Light Source Unit 10]

FIG. 2 is a plan view illustrating a configuration of a top surface of the light source unit 10. FIG. 3 is a diagram illustrating a cross-sectional configuration taken along line in FIG. 2, and FIG. 4 is a diagram illustrating a planar configuration of a bottom surface of the light source unit 10. The light source unit 10 includes a holding member 12, a wiring substrate 13, a heatsink 14, and a heat exhausting member 15, together with the plurality of laser light sources 11 (the red laser 11R, the green laser 11G, and the blue laser 11B). In FIG. 2, the wiring substrate 13 is indicated by a dashed line. For example, the holding member 12 may be formed into a substantially rectangular parallelepiped box shape, and include a bottom surface, side surfaces each rising upward from the bottom surface, and a top surface that faces the bottom surface at a height of the side surface and is provided with an opening. In FIG. 2, illustration of the top surface of the holding member 12 is omitted. The red laser 11R, the green laser 11G, and the blue laser 11B are provided on the side surfaces of the holding member 12. The red laser 11R, the green laser 11G, and the blue laser 11B are housed in a single holding member 12. Respective optical axes of light emitted from the red laser 11R, the green laser 11G, and the blue laser 11 form a plane (an XY plane) that is parallel to the bottom surface and the top surface of the holding member 12. An emission region 10L is provided in the light source unit 10, and the image light enters the projection lens 50 from the spatial modulation device that is incorporated in the light source unit 10 (the illumination unit 1A), through the emission region 10L.

The red laser 11R, the green laser 11G, and the blue laser 11B are each housed in an opening (an opening 121 in FIG. 5 described later) that is provided on the side surface (an XZ plane or a YZ plane) of the holding member 12. The red laser 11R, the green laser 11G, and the blue laser 11B each include a disc-like stem part 111 (FIG. 3), and one of surfaces of the stem part 111 (a coupling surface 111A) is provided with terminals 112. The coupling surface 111A is disposed in a direction substantially parallel to the side surface of the holding member 12. In other words, the coupling surface 111A is provided in a direction perpendicular to the bottom surface and the top surface of the holding member 12. For example, the terminals 112 may extend in a direction perpendicular to the coupling surface 111A. For example, two terminals 112 may be provided on each of the red laser 11R, the green laser 11G, and the blue laser 11B. In the green laser 11G and the blue laser 11B, the two terminals 112 are disposed in a vertical direction (the Z direction). In the red laser 11R, the two terminals 112 are disposed in a depth direction (the Y direction). For example, two of the red laser 11R, the green laser 11G, and the blue laser 11B may be disposed on the same side of the holding member 12, and the rest may be provided on the different side. In other words, one or more of the red laser 11R, the green laser 11G, and the blue laser 11B are so disposed as to have optical axis directions different from one another. One or more of the plurality of laser light sources 11 are so disposed as to have optical axis directions different from one another in the above-descried way, which makes it possible to downsize the light source unit 10. For example, the green laser 11G and the blue laser 11B may be disposed side by side on a long side (in the X direction) of the holding member 12, and the red laser 11R may be disposed on a short side (in the Y direction) of the holding member 12. The red laser 11R, the green laser 11G, and the blue laser 11B may be disposed in any layout. For example, the red laser 11R, the green laser 11G, and the blue laser 11B may be disposed one by one on different sides of the holding member 12.

FIG. 5 is a diagram illustrating the coupling surface 111A of the red laser 11R together with the side surface of the holding member 12. The green laser 11G and the blue laser 11B also have the configuration substantially similar thereto. The opening 121 provided on the side surface of the holding member 12 may have, for example, a circular shape, and the coupling surface 111A of the red laser 11R is exposed from the opening 121. A positioning part 122 is provided on the opening 121 of the holding member 12. For example, the positioning part 122 may be a part protruding to an inside of the opening 121. The positioning part 122 may have any shape, and may be a square protrusion, for example. A recessed notch part 111N is provided on the stem part 111 of the red laser 11R (and the green laser 11G and the blue laser 11B), and the notch part 111N is engaged with the positioning part 122 of the holding member 12 to fix the rotation direction of the optical axis of the red laser 11R. The recessed positioning part 122 may be provided in the opening 121 of the holding member 12, and the protrusion may be provided on the stem part 111 of the red laser 11R. Fixing the rotation directions of the respective optical axes of the red laser 11R, the green laser 11G, and the blue laser 11B makes it possible to fix a long axis direction of a far field pattern (FFP) to a predetermined angle. The long axis directions of the respective far field patterns of the red laser 11R, the green laser 11G, and the blue laser 11B may be desirably aligned mutually. As mentioned above, the holding member 12 plays the role to determine the position of each of the red laser 11R, the green laser 11G, and the blue laser 11B with the corresponding opening 121 and to determine the rotation direction of the optical axis with the corresponding positioning part 122.

A guide part 12G to fix the position of the heatsink 14 is provided on the holding member 12 (FIG. 2). The guide part 12G may be, for example, a recess extending in the vertical direction of the holding member 12 (in a direction parallel to the coupling surface 111A, or in the Z direction). A protrusion 14P of the heatsink 14 is inserted into the guide part 12G, which determines the position of the heatsink 14 with respect to the holding member 12. The guide part 12G of the holding member 12 may be formed of a protrusion, and the heatsink 14 may have a recess. The guide part 12G may be preferably provided on each of the long side and the short side of the holding member 12.

The holding member 12 is in contact with the red laser 11R, the green laser 11G, and the blue laser 11B. Thus, the holding member 12 may be preferably formed of a material with high heat dissipation property. For example, the holding member 12 may be made of a metal material. More specifically, examples of the metal material may include aluminum, an aluminum alloy, zinc, a zinc alloy, magnesium, a magnesium alloy, copper, and a copper alloy. A filler of, for example, carbon or a metal may be added to a resin material to form the holding member 12. The holding member 12 may be shaped by, for example, a die casting method, an extrusion molding method, or a cutting method.

For example, as illustrated in FIG. 6, together with the red laser 11R, the green laser 11G, and the blue laser 11B, other optical members may be housed in the holding member 12 (FIG. 2). For example, coupling lenses 21A, 21B, and 21C, dichroic mirrors 22A and 22B, an integrator (a fly-eye lens) 23, a condenser lens 24, a polarization beam splitter 25, and the reflective liquid crystal device (the spatial modulation device) 30 may be provided in the holding member 12. Positioning parts and fixing parts of these optical members are provided on the top surface side on the bottom surface of the holding member 12. The optical members may be assembled from the top surface of the holding member 12 having the opening. The optical members may be fixed through a method such as bonding, for example, after being positioned. After the optical members are assembled, a light-shielding protective cover (not illustrated) may be attached to the top surface of the holding member 12. The protective cover may be formed of, for example, a metal plate or a resin.

The coupling lens 21A, the dichroic mirrors 22A and 22B, the integrator 23, and the condenser lens 24 are disposed on the optical axis of the red laser 11R in this order from the red laser 11R side. The optical axis of the green laser 11G intersects the optical axis of the red laser 11R at right angles in the dichroic mirror 22A. The coupling lens 21B and the dichroic mirror 22A are disposed on the optical axis of the green laser 11G in this order from the green laser 11G side. The optical axis of the blue laser 11B intersects the optical axis of the red laser 11R at right angles in the dichroic mirror 22B. The coupling lens 21C and the dichroic mirror 22B are disposed on the optical axis of the blue laser 11B in this order from the blue laser 11B side.

The coupling lens 21A substantially parallelizes the light emitted from the red laser 11R (FIG. 6), and converts a directivity angle of the light emitted from the red laser 11R to be equal to or close to a directivity angle of the parallel light. The coupling lens 21A is disposed at a position at which light within the directivity angle out of the light emitted from the red laser 11R enters. The coupling lens 21B substantially parallelizes the light emitted from the green laser 11G (FIG. 6), and converts a directivity angle of the light emitted from the green laser 11G to be equal to or close to a directivity angle of the parallel light. The coupling lens 21B is disposed at a position at which light within the directivity angle out of the light emitted from the green laser 11G enters. The coupling lens 21C substantially parallelizes the light emitted from the blue laser 11B, and converts a directivity angle of the light emitted from the blue laser 11B to be equal to or close to a directivity angle of the parallel light. The coupling lens 21C is disposed at a position at which light within the directivity angle out of the light emitted from the blue laser 11B enters. In other words, the coupling lenses 21A, 21B, and 21C are respectively disposed one by one for the red laser 11R, the green laser 11G, and the blue laser 11B (for each package). Note that each of the coupling lenses 21A, 21B, and 21C may be configured of a single lens or a plurality of lenses.

Each of the dichroic mirrors 22A and 22B includes one mirror having wavelength selectivity. Note that the above-described mirror may be formed through, for example, vapor deposition of multilayer interference film. The dichroic mirror 22A allows light that has entered the mirror from back surface side thereof (light that has entered the mirror from the red laser 11R side), to pass therethrough to front surface side of the mirror, and reflects light that has entered the mirror from the front surface side thereof (light that has entered the mirror from the green laser 11G side). In contrast, the dichroic mirror 22B allows light that has entered the mirror from back surface side thereof (light of the red laser 11R and the green laser 11G that have entered the mirror from the dichroic mirror 22A side), to pass therethrough to front surface side of the mirror, and reflects light that has entered the mirror from the front surface side thereof (light that has entered the mirror from the blue laser 11B side). In other words, the dichroic mirrors 22A and 22B compose light fluxes respectively emitted from the red laser 11R, the green laser 11G, and the blue laser 11B to a single light flux.

The integrator 23 uniforms illuminance distribution (luminance distribution) of the light within an illumination range of the reflective liquid crystal device 30, and may be configured of one fly-eye lens, for example. The integrator 23 may be configured of a pair of fly-eye lenses.

The condenser lens 24 condenses light fluxes from a multiple light source that is formed of the integrator 23, to illuminate the illumination range of the reflective liquid crystal device 30 in an overlapping manner.

The polarization beam splitter 25 is disposed in an optical path between the condenser lens 24 and the reflective liquid crystal device 30. The polarization beam splitter 25 is an optical member that selectively allows specific polarized component of light (for example, P-polarized light) to pass therethrough, and selectively reflects the other polarized component of the light (for example, S-polarized light). Thus, the light (for example, S-polarized light) entering the polarization beam splitter 25 from the condenser lens 24 side is selectively reflected by the polarization beam splitter 25, and the reflected light then enters the reflective liquid crystal device 30.

The reflective liquid crystal device 30 two-dimensionally modulates the light flux from the condenser lens 24, on the basis of color image signals (supplied image signals) corresponding to respective wavelength components of the red laser 11R, the green laser 11G, and the blue laser 11B, thereby generating image light. The reflective liquid crystal device 30 may be configured of, for example, a liquid crystal panel using a twisted nematic (TN) liquid crystal (a liquid crystal molecule having positive refractive index anisotropy). More specifically, the reflective liquid crystal device 30 has a configuration in which a liquid crystal layer (not illustrated) that uses the liquid crystal of TN mode is sandwiched between paired substrates (not illustrated) to which a drive voltage based on the image signal is applied for a plurality of pixels (not illustrated) arranged in matrix.

An end of the wiring substrate 13 is electrically coupled with the terminals 112 of each of the red laser 11R, the green laser 11G, and the blue laser 11B. A portion of the wiring substrate 13 is disposed at a position facing the coupling surface 111A of each of the red laser 11R, the green laser 11G, and the blue laser 11B, with a distance from the coupling surface 111A (FIG. 3). A hole is provided at a portion of the wiring substrate 13 facing the coupling surface 111A, and the terminals 112 penetrate through the hole (FIG. 5). For example, the terminals 112 may be coupled with the wiring substrate 13 through solder parts 131. In other words, the wiring substrate 13 is coupled with the terminals 112 at the position facing the coupling surface 111A. The wiring substrate 13 may be, for example, a flexible printed circuit (FPC) board. The wiring substrate 13 faces the coupling surface 111A of each of the red laser 11R, the green laser 11G, and the blue laser 11B, and is bent in a direction intersecting the coupling surface 111A. For example, the wiring substrate 13 is bent in a direction substantially perpendicular to the coupling surface 111A from a direction substantially parallel to the coupling surface 111A, and extends along the top surface of the holding member 12. The wiring substrate 13 may extend along the protective cover (not illustrated) that is attached to the top surface of the holding member 12. A first end of one wiring substrate 13 may be branched, for example, and the branched ends may be electrically coupled respectively with the terminals 112 of the red laser 11R, the green laser 11G, and the blue laser 11B. A second end of the wiring substrate 13 is electrically coupled with a control section (not illustrated) of the light source unit 10, and signals to drive the red laser 11R, the green laser 11G, and the blue laser 11B are transmitted to the terminals 112 through the wiring substrate 13.

Heat emitted from the red laser 11R, the green laser 11G, and the blue laser 11B may be transferred to a heatsink (the heatsink 14) to cool the red laser 11R, the green laser 11G, and the blue laser 11. The heatsink 14 is in contact with the side surfaces of the holding member 12, and may surround the three sides of the holding member 12, for example. The heatsink 14 includes a bottom part 142 (FIG. 4), and the bottom part 142 is in contact with the bottom surface of the holding member 12. A plurality of fins 141 are provided on an outer circumference of the heatsink 14. Providing the plurality of fins 141 increases a surface area of the heatsink 14, thereby improving heat dissipation efficiency. Each of the fins 141 may be, for example, a plate-like protrusion, but may have any shape. The material for forming the heatsink 14 may be similar to that for forming the above-described holding member 12. More specifically, a metal material such as aluminum, an aluminum alloy, zinc, a zinc alloy, magnesium, a magnesium alloy, copper, and a copper alloy, or a resin material added with a filler may be used to form the heatsink 14. The heatsink 14 may be shaped by, for example, a die casting method, an extrusion molding method, or a cutting method.

The heatsink 14 is so provided separately from the terminal 112 as to avoid the terminals 112 of the red laser 11R, the green laser 11G, and the blue laser 11B that are protruded from the side surfaces of the holding member 12. In the present embodiment, adjacent parts 14CA and 14CB (a first adjacent part and a second adjacent part) are provided on the heatsink 14 at positions near the terminals 112 (FIG. 2 and FIG. 3). The adjacent parts 14CA and 14CB are adjacent to the coupling surface 111A of each of the red laser 11R, the green laser 11G, and the blue laser 11B. This causes the heat to be directly transferred from the red laser 11R, the green laser 11G, and the blue laser 11B to the heatsink 14 without the holding member 12, although the detail is described later.

The adjacent part 14CA and the adjacent part 14CB face each other with the terminals 112 in between. The adjacent part 14CA is adjacent to a first end portion of the coupling surface 111A, and the adjacent part 14CB is adjacent to a second end portion of the coupling surface 111A (FIG. 2). In other words, the heatsink 14 is adjacent to both ends of the coupling surface 111A with the terminal 112 in between. At least a portion of the adjacent parts 14CA and 14CB is provided between the wiring substrate 13 (a part facing the coupling surface 111A) and the coupling surface 111A, and for example, a distance between the adjacent part 14CA and the adjacent part 14CB may be smaller than a width of the portion of the wiring substrate 13 facing the coupling surface 111A (FIG. 2 and FIG. 3). Providing such adjacent parts 14CA and 14CB increases the area of the portion of the heatsink 14 adjacent to the coupling surface 111A. A heat conduction layer 16 is provided between the adjacent part 14CA and the coupling surface 111A and between the adjacent part 14CB and the coupling surface 111A (FIG. 3). The heat conduction layer 16 may be formed of, for example, heat-conductive soft grease. The heat emitted from the red laser 11R, the green laser 11G, and the blue laser 11B is transferred to the heatsink 14 through the heat conduction layer 16.

The heatsink 14 has a separation part 14S at a position facing the coupling surface 11A with the wiring substrate 13 in between, and the adjacent part 14CA and the adjacent part 14CB are jointed to each other through the separation part 14S. More specifically, a joint part 14RA is provided between the separation part 14S and the adjacent part 14CA, and a joint part 14RB is provided between the separation part 14S and the adjacent part 14CB. The adjacent parts 14CA and 14CB, the joint parts 14RA and 14RB, and the separation part 14S are so provided as to surround the terminals 112. A distance between the joint part 14RA and the joint part 14RB that face each other with the terminals 112 in between is larger than the distance between the adjacent part 14CA and the adjacent part 14CB, and further, is larger than the width of the portion of the wiring substrate 13 facing the coupling surface 111A. The adjacent parts 14CA and 14CB, the joint parts 14RA and 14RB, and the separation part 14S are provided integrally with the bottom part 142. In other words, these parts are jointed to one another through the bottom part 142. Providing the bottom part 142, the joint parts 14RA and 14RB, and the separation part 14S increases the surface area of the heatsink 14, thereby improving heat dissipation efficiency. The fin 141 may be provided on an outer circumference of the separation part 14S.

The protrusion 14P of the heatsink 14 is provided at a position corresponding to the guide part 12G of the holding member 12, and the protrusion 14P is engaged with the guide part 12G. The protrusion 14P extends in the vertical direction (in a direction parallel to the coupling surface 111A, or in the Z direction).

The heat exhausting member 15 (FIG. 4) may be provided, for example, at a position facing the bottom surface of the holding member 12 (or the bottom part 142 of the heatsink 14). The heat exhausting member 15 may be, for example, a cooling fan, and increases an amount of air passing near the red laser 11R, the green laser 11G, and the blue laser 11B, thereby cooling the red laser 11R, the green laser 11G, and the blue laser 11B. The heat exhausting member 15 may be desirably provided to increase the amount of the air passing near the fin 141 of the heatsink 14. It is sufficient for the heat exhausting member 15 to be provided at a position to uniformly cool the red laser 11R, the green laser 11G, and the blue laser 11B, and the heat exhausting member 15 may also be provided on the top surface of the holding member 12.

[Method of Manufacturing Light Source Unit 10]

Such a light source unit 10 may be manufactured, for example, in the following manner.

As illustrated in FIG. 7 and FIG. 8, first the holding member 12 is prepared, and the red laser 11R, the green laser 11G, and the blue laser 11B are each inserted into the corresponding opening 121 of the holding member 12 and fixed thereto.

Thereafter, the wiring substrate 13 is coupled with the respective terminals 112 of the red laser 11R, the green laser 11G, and the blue laser 11B, as illustrated in FIG. 9. At this time, the wiring substrate 13 is coupled with the terminals 112 while a gap that is equal to or larger than thicknesses of the adjacent parts 14CA and 14CB of the heatsink 14 is provided between the wiring substrate 13 and the coupling surface 111A of each of the red laser 11R, the green laser 11G, and the blue laser 11B. For example, a jig having a predetermined size may be interposed between the coupling surface 111A and the wiring substrate 13, and the wiring substrate 13 and the terminals 112 are soldered.

Thereafter, the heatsink 14 illustrated in FIG. 10 is disposed at a position facing the bottom surface of the holding member 12. At this time, the heat conduction layer 16 is provided at the portion of the heatsink 14 that is to be in contact with the coupling surface 111A of each of the red laser 11R, the green laser 11G, and the blue laser 11B. The heat conduction layer 16 may be formed on the coupling surface 111A of each of the red laser 11R, the green laser 11G, and the blue laser 11B. Thereafter, the position of the protrusion 14P of the heatsink 14 is aligned with the guide part 12G of the holding member 12, and the protrusion 14P is slid upward (in the Z direction). This brings the bottom part 142 of the heatsink 14 into contact with the bottom surface of the holding member 12, and the position of the heatsink 14 is fixed. The heatsink 14 may be fixed to the holding member 12 through, for example, screwing, after the heatsink 14 is slid. This makes it possible to easily and surely provide the heat conduction layer 16 between the coupling surface 111A and the adjacent parts 14CA and 14CB of the heatsink 14.

After the heatsink 14 is fixed to the holding member 12, the heat exhausting member 15 is incorporated thereto to complete the light source unit 10 illustrated in FIG. 2 to FIG. 4.

[Operation of Display Apparatus 1]

In the display apparatus 1, the light emitted from the red laser 11R, the green laser 11G, and the blue laser 11B of the illumination unit 1A are polarized and separated by the polarization beam splitter 25, and one polarized component of the light (for example, S-polarized light) enters the reflective liquid crystal panel 30. In the reflective liquid crystal panel 30, the incident light is modulated on the basis of the image signal and is reflected, which results in image light. The image light is extracted from the emission region 10L through the polarization beam splitter 25. The light enters the projection lens 50, and is then projected (enlarged and projected) to the screen 60.

At this time, in the light source unit 10, the red laser 11R, the green laser 11G, and the blue laser 11B sequentially generate light (perform pulse light emission) in a time-divisional manner, and emit laser light. Then, in a reflective liquid crystal panel 40, the laser light of color is sequentially modulated in a time-divisional manner on the basis of the corresponding image signal of each color component (a red component, a green component, and a blue component). As a result, color image display based on the image signals is performed in the display apparatus 1.

[Action of Display Apparatus 1]

Since the heat is directly transferred from the red laser 11R, the green laser 11G, and the blue laser 11B to the heatsink 14 in the light source unit 10 of the display apparatus 1, it is possible to improve heat dissipation efficiency. The action is described below.

FIG. 11 is a diagram illustrating a cross-sectional configuration of a light source unit 200 according to a comparative example. In the light source unit 200, a wiring substrate 213 is provided adjacently to the coupling surface 111A of the blue laser 11B (or the red laser 11R or the green laser 11G). The terminals 112 are coupled with the wiring substrate 213 through solder parts 212. Thus, a heatsink 214 is disposed separately from the coupling surface 111A of the blue laser 11B and is in contact with the holding member 12. Even if the heatsink 114 is able to be disposed adjacently to a portion of the coupling surface 111A that is widened from the wiring substrate 213, an area of the portion of the heatsink 214 adjacent to the coupling surface 111A is decreased. In such a light source unit 100, it is difficult to transfer the heat emitted from the blue laser 11B directly to the heatsink 214. Thus, the heat is transferred to the heatsink 214 through the holding member 12. This decreases heat dissipation efficiency.

In contrast, in the light source unit 10, the wiring substrate 13 is provided separately from the coupling surface 111A of each of the red laser 11R, the green laser 11G, and the blue laser 11B. This makes it possible to provide the parts (the adjacent parts 14CA and 14CB) of the heatsink 14 adjacently to the coupling surface 111A. Further, the surface of the portion of the coupling surface 111A adjacent to the heatsink 14 is also increased. The heatsink 14 has such adjacent parts 14CA and 14CB, which causes the heat emitted from the red laser 11R, the green laser 11G, and the blue laser 11B to be directly transferred to the heatsink 14 that has high heat dissipation property, without other members such as the holding member 12. Thus, it is possible to improve heat dissipation efficiency as compared with the above-described light source unit 200.

As mentioned above, in the present embodiment, the heatsink 14 includes the adjacent parts 14CA and 14CB. Thus, the heat is directly transferred from the coupling surface 111A of each of the red laser 11R, the green laser 11G, and the blue laser 11B to the heatsink 14 without the holding member 12. This makes it possible to improve heat dissipation efficiency of the red laser 11R, the green laser 11G, and the blue laser 11B.

Also, the heatsink 14 is incorporated in the holding member 12 from the bottom surface of the holding member 12. Thus, the heatsink 14 may be attached easily even after the terminals 112 and the wiring substrate 13 are coupled with each other. The terminals 112 and the wiring substrate 13 may be coupled with each other after the heatsink 14 is attached to the holding member 12. In this case, although the heatsink may be attached in various directions of the holding member 12, it is difficult to increase the surface area of the heatsink 14 because a space for the work to couple the terminals 112 with the wiring substrate 13 is secured. Thus, attaching the heatsink 14 to the holding member 12 after the terminals 112 and the wiring substrate 13 are coupled with each other makes it possible to increase the surface area of the heatsink 14 and to accordingly improve heat dissipation efficiency.

In the following, modification examples of the above-described embodiment are described. The components same as those of the above-described embodiment are denoted by the same reference numerals and the description thereof is appropriately omitted.

<Modification Example 1>

FIG. 12 is a diagram illustrating a cross-sectional configuration of a light source unit (a light source unit 10A) according to a modification example 1. In the light source unit 10A, a temperature sensor 17 is mounted on the wiring substrate 13. Except this point, the light source unit 10A has a configuration similar to that of the light source unit 10, and also has action and the effects similar to those of the light source unit 10.

The temperature sensor 17 detects temperature near the blue laser 11B (and the red laser 11R and the green laser 11G), and may be, for example, a thermistor. Providing the temperature sensor 17 makes it possible to perform correction of variation in the laser characteristics caused by temperature variation, and to perform power control to prevent drastic temperature increase.

In the light source unit 10A including the temperature sensor 17, the heat exhausting member 15 (FIG. 4) may be preferably disposed in a direction opposite to the extraction direction of the wiring substrate 13. In other words, at least a portion of the wiring substrate 13 may be preferably provided on a first surface of the holding member 12, and the heat exhausting member 15 may be provided on a second surface of the holding member 12. For example, when the wiring substrate 13 extends along the top surface of the holding member 12, the heat exhausting member 15 may be preferably provided at a position facing the bottom surface of the holding member 12. This enables the heatsink 14 (the bottom part 142, the adjacent parts 14CA and 14CB, and the separation part 14S) to block wind from the heat exhausting member 15, thereby reducing influence of the heat exhausting member 15 on the temperature sensor 17.

<Modification Example 2>

FIG. 13 is a diagram illustrating a cross-sectional configuration of a light source unit (a light source unit 10B) according to a modification example 2. In the light source unit 10B, a wiring substrate (a wiring substrate 13A) and terminals (terminals 112A) are coupled with each other on a top surface thereof. Except this point, the light source unit 10B has a configuration similar to that of the light source unit 10, and also has action and effects similar to those of the light source unit 10.

The wiring substrate 13 is provided in a planar shape on the top surface of the light source unit 10B. The terminals 112A are bent and extend in a direction substantially parallel to the coupling surface 111A from a direction substantially perpendicular to the coupling surface 111A. The terminals 112A extend to the outside of the coupling surface 111A in a planar view (on the XZ plane), and penetrate through the wiring substrate 13A. Bending the terminals 112A as mentioned above makes it possible to couple the terminals 112A with the wiring substrate 13A at positions outside the coupling surface 111A in a planar view. In such a light source unit 10B, it is easy to secure the work space and to couple the terminals 112A with the wiring substrate 13A even after the heatsink 14 is attached to the holding member 12. In other words, it is possible to couple the terminals 112A with the wiring substrate 13A after attachment of the heatsink 14 without reducing the surface area of the heatsink 14.

<Modification Example 3>

FIG. 14 is a diagram illustrating a planar configuration of a top surface of a light source unit (a light source unit 10C) according to a modification example 3. A heatsink (a heatsink 84) of the light source unit 10C functions as a heatsink and also functions as a holding member. Except this point, the light source unit 10C has a configuration similar to that of the light source unit 10, and also has action and effects similar to those of the light source unit 10. In FIG. 4, illustration of the wiring substrate 13 is omitted.

In the heatsink 84, the holding member is integrated with the heatsink. In other words, the heatsink 84 houses therein the red laser 11R, the green laser 11G, and the blue laser 11B, and has a function to cool the red laser 11R, the green laser 11G, and the blue laser 11B. In the light source unit 10C in which the holding member is integrated with the heatsink as mentioned above, it is possible to further improve the heat dissipation efficiency. The heatsink 84 may preferably include a fin 841 to increase the surface area, as with the heatsink 14 (FIG. 2).

It is sufficient for the heatsink 84 to include adjacent parts 84CA and 84CB that are adjacent to the coupling surface 111A of each of the red laser 11R, the green laser 11G, and the blue laser 11B, and it is not necessary for the heatsink 84 to include a part (for example, a separation part 84S of FIG. 15 described later) facing the coupling surface 111A (FIG. 13). When the heatsink 84 does not include the part facing the coupling surface 111A (FIG. 14), it is possible to improve workability in soldering of the wiring substrate to the respective terminals of the red laser 11R, the green laser 11G, and the blue laser 11B.

As illustrated in FIG. 15, the heatsink 84 may include the separation part 84S facing the coupling surface 111A. The adjacent part 84CA and the adjacent part 84CB are jointed to each other through the separation part 84S. A joint part 84RA is provided between the separation part 84S and the adjacent part 84CA, and a joint part 84RB is provided between the separation part 84S and the adjacent part 84CB. Providing the heatsink 84 with the separation part 84S and the joint parts 84RA and 84RB increases the surface area of the heatsink 84, thereby improving heat dissipation efficiency.

<Modification Example 4>

FIG. 16 is a diagram illustrating a cross-sectional configuration of a light source unit (a light source unit 10D) according to a modification example 4. In the light source unit 10D, heatsinks (heatsinks 94-1 and 94-2) are respectively provided on the long side and the short side of the holding member 12. Except this point, the light source unit 10D has a configuration similar to that of the light source unit 10, and also has action and effects similar to those of the light source unit 10. In FIG. 15, illustration of the wiring substrate 13 is omitted.

The light source unit 10 includes the heatsinks 94-1 and 94-2, and the heatsink 94-1 is separated from the heatsink 94-2. For example, the heatsink 94-1 may be provided along the long side of the holding member 12, and the heatsink 94-2 may be provided along the short side of the holding member 12. Adjacent parts 94-1CA and 94-1CB of the heatsink 94-1 are in contact with the coupling surface 111A of each of the green laser 11G and the blue laser 11, and adjacent parts 94-2CA and 94-2CB of the heatsink 94-2 are in contact with the coupling surface 111A of the red laser 11R. The heatsinks 94-1 and 94-2 may respectively include separation parts 94-1S and 94-2S that face the coupling surface 111A. In the heatsink 94-1, the adjacent part 94-1CA and the adjacent part 94-1CB are jointed to each other through the separation part 94-1S. A joint part 94-1RA is provided between the separation part 94-1S and the adjacent part 94-1CA, and a joint part 94-1RB is provided between the separation part 94-1S and the adjacent part 94-1CB. In the heatsink 94-2, the adjacent part 94-2CA and the adjacent part 94-2CB are jointed to each other through the separation part 94-2S. A joint part 94-2RA is provided between the separation part 94-2S and the adjacent part 94-2CA, and a joint part 94-2RB is provided between the separation part 94-2S and the adjacent part 94-2CB.

Hereinbefore, although the technology has been described with reference to the embodiment and the modification examples, the technology is not limited to the above-described example embodiments, and various modifications may be made. For example, although the case in which any of the plurality of light emitting devices in the light source unit is a laser light source has been described in the above-described example embodiments, the light emitting device is not limited thereto. Alternatively, another light emitting device (such as a light emitting diode (LED)) may be included, or the LED and the laser light source may be combined and provided.

Also, the above-described example embodiments describe the case in which the light source unit includes the three laser light sources 11 (the red laser 11R, the green laser 11G, and the blue laser 11B); however, the light source unit may include four or more laser light sources 11. Alternatively, the light source unit may be configured of one or two laser light sources 11.

Further, FIG. 14 illustrates the case in which the heatsink 84 is not provided with the separation part; the heatsink 14 (FIG. 2) and the heatsinks 94-1 and 94-2 do not need to be provided with the separation part (FIG. 16).

In addition, the above-described example embodiments describe the case in which the coupling lenses 21A, 21B, and 21C, the dichroic mirrors 22A and 22B, the integrator 23, the condenser lens 24, the polarization beam splitter 25, and the reflective liquid crystal device 30 are provided in the holding member 12 together with the laser light sources 11; however, the configuration is not limited thereto. For example, it is also possible to provide the coupling lenses 21A, 21B, and 21C, the dichroic mirrors 22A and 22B, the integrator 23, and the condenser lens 24 in the holding member 12 together with the laser light sources 11; and to provide the polarization beam splitter 25 and the reflective liquid crystal device 30 outside the holding member 12. It is sufficient for the holding member 12 to be provided with at least the laser light sources 11, and it is sufficient for the optical members to be appropriately disposed.

The above-described example embodiments describe the reflective liquid crystal panel as an example of the spatial modulation device. The spatial modulation device, however, is not limited thereto, and may be, for example, a transmissive liquid crystal panel or a digital micromirror device (DMD). Further, the technology is also applicable to an illumination unit (a light source unit) of a laser scanning projector that uses micro electro mechanical systems (MEMS) mirror without using the spatial modulation device.

In addition, the above-described example embodiments specifically describe the components (optical systems) of the illumination unit and the display apparatus; however, all of the components are not necessarily provided, and other components may be further included.

Further, although the above-described embodiment describes the projector as an example of the display apparatus in, the technology is also applicable to a direct-view display apparatus, an exposure apparatus such as a stepper, and a sensor apparatus.

Note that the effects described in the present specification are illustrative and non-limiting. Effects achieved by the technology may be effects other than those described above.

It is to be noted that an embodiment of the technology may have the following configurations.

(1)

An illumination unit including:

a light emitting device with a coupling surface, the light emitting device including a terminal provided on the coupling surface;

a holding member that houses the light emitting device;

a wiring substrate that is provided separately from the coupling surface of the light emitting device and is electrically coupled with the terminal; and a heatsink that includes an adjacent part adjacent to the coupling surface of the light emitting device.

(2)

The illumination unit according to (1), wherein the heatsink is provided with a fin.

(3)

The illumination unit according to (1) or (2), wherein the wiring substrate is coupled with the terminal at a position facing the coupling surface, and at least a portion of the adjacent part is provided between the wiring substrate and the coupling surface.

(4)

The illumination unit according to any one of (1) to (3), wherein the wiring substrate faces the coupling surface and is bent in a direction intersecting the coupling surface.

(5)

The illumination unit according to any one of (1) to (4), wherein the heatsink includes a first adjacent part that is adjacent to a first end portion of the coupling surface, and a second adjacent part that is adjacent to a second end portion of the coupling surface.

(6)

The illumination unit according to any one of (1) to (5), wherein the heatsink includes a separation part that faces the coupling surface, and a joint part that is provided between the separation part and the adjacent part.

(7)

The illumination unit according to any one of (1) to (6), wherein the wiring substrate is mounted with a temperature sensor that detects temperature near the light emitting device.

(8)

The illumination unit according to any one of (1) to (7), further including a heat exhausting member that cools the light emitting device, wherein at least a portion of the wiring substrate is provided on a first surface of the holding member, and the heat exhausting member is provided on a second surface of the holding member.

(9)

The illumination unit according to (1) or (2), wherein the terminal is coupled with the wiring substrate at a position outside the coupling surface in a planar view.

(10)

The illumination unit according to any one of (1) to (9), wherein the holding member includes a guide part to determine a position of the heatsink.

(11)
The illumination unit according to (10), wherein the guide part is a protrusion or a recess extending in a direction parallel to the coupling surface.
(12)
The illumination unit according to any one of (1) to (11), wherein the light emitting device includes a plurality of light emitting devices.
(13)
The illumination unit according to (12), wherein two or more of the plurality of light emitting devices are disposed to have optical axis directions different from one another.
(14)
The illumination unit according to (12) or (13), wherein one heatsink is provided for the plurality of light emitting devices.
(15)
The illumination unit according to any one of (1) to (14), wherein the holding member includes an opening that houses the light emitting device.
(16)
The illumination unit according to (15), wherein
the light emitting device includes a stem part provided with a notch part, and
the opening of the holding member includes a positioning part that is engaged with the notch part of the light emitting device.
(17)
The illumination unit according to any one of (1) to (16), further including an optical member, the optical member being housed in the holding member.
(18)
The illumination unit according to any one of (1) to (17), wherein a heat conduction layer is provided between the adjacent part and the light emitting device.
(19)
The illumination unit according to any one of (1) to (18), wherein the holding member is integrated with the heatsink.
(20)
A display apparatus provided with an illumination unit and a projection unit that projects illumination light from the illumination unit, the illumination unit including:
a light emitting device with a coupling surface, the light emitting device including a terminal provided on the coupling surface;
a holding member that houses the light emitting device;
a wiring substrate that is provided separately from the coupling surface of the light emitting device and is electrically coupled with the terminal; and
a heatsink that includes an adjacent part adjacent to the coupling surface of the light emitting device.

This application is based upon and claims the benefit of priority of the Japanese Patent Application No. 2014-105136 filed in the Japan Patent Office on May 21, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An illumination unit, comprising:
at least one light emitting device, wherein the at least one light emitting device includes a coupling surface and at least one terminal on the coupling surface;
a holding member that houses the at least one light emitting device;
a wiring substrate, wherein the wiring substrate is electrically coupled with the at least one terminal of the at least one light emitting device; and
a heatsink that includes:
at least one adjacent part adjacent to the coupling surface of the at least one light emitting device;
a separation part that faces the coupling surface; and
a joint part that is between the separation part and the at least one adjacent part.
2. The illumination unit according to claim 1, wherein the heatsink further includes a fin.
3. The illumination unit according to claim 1, wherein
the wiring substrate is coupled with the at least one terminal at a position that faces the coupling surface, and
at least a portion of the at least one adjacent part is between the wiring substrate and the coupling surface.
4. The illumination unit according to claim 3, wherein the wiring substrate faces the coupling surface, and wherein the wiring substrate is bent in a direction that intersects the coupling surface.
5. The illumination unit according to claim 1, wherein
a first adjacent part of the at least one adjacent part is adjacent to a first end portion of the coupling surface, and
a second adjacent part of the at least one adjacent part is adjacent to a second end portion of the coupling surface.
6. The illumination unit according to claim 1, further comprising a temperature sensor on the wiring substrate, wherein the temperature sensor is configured to detect a temperature in a specific distance of the at least one light emitting device.
7. The illumination unit according to claim 6, further comprising a heat exhausting member configured to cool the at least one light emitting device, wherein
the holding member includes a first surface and a second surface, and
at least a portion of the wiring substrate is on the first surface and the heat exhausting member is on the second surface.
8. The illumination unit according to claim 1, wherein the at least one terminal is coupled with the wiring substrate at a position outside the coupling surface in a planar view.
9. The illumination unit according to claim 1, wherein the holding member includes a guide part to determine a position of the heatsink.
10. The illumination unit according to claim 9, wherein the guide part is a protrusion or a recess that extends in a direction parallel to the coupling surface.
11. The illumination unit according to claim 1, wherein the at least one light emitting device comprises a plurality of light emitting devices.
12. The illumination unit according to claim 11, wherein a first optical axis direction of a first light emitting device of the plurality of light emitting devices is different from a second optical axis direction of a second light emitting device of the plurality of light emitting devices.
13. The illumination unit according to claim 11, wherein the heatsink is for the plurality of light emitting devices.
14. The illumination unit according to claim 1, wherein the holding member includes an opening, and wherein the opening houses the at least one light emitting device.
15. The illumination unit according to claim 14, wherein the at least one light emitting device further includes a stem part, wherein the stem part includes a notch part, and the opening of the holding member includes a positioning part that is engaged with the notch part of the at least one light emitting device.

16. The illumination unit according to claim 1, further comprising an optical member, wherein the holding member houses the optical member.

17. The illumination unit according to claim 1, wherein a heat conduction layer is between the at least one adjacent part and the at least one light emitting device.

18. The illumination unit according to claim 1, wherein the holding member is integrated with the heatsink.

19. A display apparatus provided with an illumination unit and a projection unit that projects illumination light from the illumination unit, the illumination unit comprising:
- at least one light emitting device, wherein the at least one light emitting device includes a coupling surface and at least one terminal on the coupling surface;
- a holding member that houses the at least one light emitting device;
- a wiring substrate, wherein the wiring substrate is electrically coupled with the at least one terminal of the at least one light emitting device; and
- a heatsink that includes:
  - at least one adjacent part adjacent to the coupling surface of the at least one light emitting device;
  - a separation part that faces the coupling surface; and
  - a joint part that is between the separation part and the at least one adjacent part.

20. An illumination unit, comprising:
- a plurality of light emitting devices, wherein the plurality of light emitting devices includes a coupling surface, wherein each of the plurality of light emitting devices includes at least one terminal on the coupling surface, wherein a first optical axis direction of a first light emitting device of the plurality of light emitting devices is different from a second optical axis direction of a second light emitting device of the plurality of light emitting devices;
- a holding member that houses the plurality of light emitting devices;
- a wiring substrate, wherein the wiring substrate is electrically coupled with the at least one terminal of each of the plurality of light emitting devices; and
- a heatsink that includes at least one adjacent part adjacent to the coupling surface of the plurality of light emitting devices.

21. An illumination unit, comprising:
- at least one light emitting device, wherein the at least one light emitting device includes a coupling surface and at least one terminal on the coupling surface;
- a holding member that houses the at least one light emitting device;
- a wiring substrate, wherein the wiring substrate is electrically coupled with the at least one terminal of the at least one light emitting device;
- a heat conduction layer; and
- a heatsink that includes at least one adjacent part adjacent to the coupling surface of the at least one light emitting device, wherein the heat conduction layer is between the at least one adjacent part and the at least one light emitting device.

22. An illumination unit, comprising:
- at least one light emitting device, wherein the at least one light emitting device includes a coupling surface and at least one terminal on the coupling surface;
- a holding member that houses the at least one light emitting device;
- a wiring substrate, wherein the wiring substrate is electrically coupled with the at least one terminal of the at least one light emitting device; and
- a heatsink that includes at least one adjacent part adjacent to the coupling surface of the at least one light emitting device, wherein the heatsink is integrated with the holding member.

* * * * *